Patented Apr. 4, 1950

2,502,426

UNITED STATES PATENT OFFICE 2,502,426

3-ACYLAMINO-2-ω-R-ALKYL-4-THIOPHENE-CARBOXYLIC ACID AZIDES

Lee C. Cheney, Syracuse, N. Y., and John Robert Piening, Detroit, Mich., assignors to Parke, Davis & Company, Detroit, Mich., a corporation of Michigan No Drawing. Original application December 23, 1944, Serial No. 569,640. Divided and this application April 8, 1946, Serial No. 660,404

4 Claims. (Cl. 260—329)

This invention relates to the preparation of new compounds useful as intermediates for the synthesis of pharmaceuticals particularly compounds possessing biotin and possible anti-biotin activity.

This application is a division of our application Serial No. 569,640, filed December 23, 1944, now Patent No. 2,466,004, issued April 5, 1949, and relates more particularly to the preparation of 3-acylamino-2-ω-R-alkyl-4-thiophenecarboxylic acid azides. These new compounds are prepared by treating 3-acylamino-2-ω-R-alkyl-4-thiophenecarboxylic acid hydrazides with nitrous acid and the process is illustrated as follows:

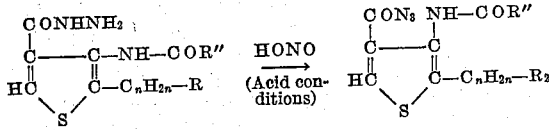

where R is a radical of the class —COOH, —COOM, alkoxy, aralkoxy and aryloxy, where M is a salt-forming basic group or metal such as sodium or other alkali metal, alkaline earth metal, magnesium, ammonium and substituted ammonium, such as monoalkylammonium and dialkylammonium, —COR'' is an organic carboxylic acid acyl radical, $R_2$ is a radical of the class —COOH, alkoxy, aralkoxy and aryloxy and $n$ is an integer from 1 to 8.

The preparation of the starting materials of this divisional application is described in our parent application Serial No. 569,640 and the co-pending application Serial No. 569,639 filed December 23, 1944, now Patent No. 2,443,598 issued June 22, 1948.

The following examples illustrate the invention.

Example 1

*3-benzoylamino-4-carbethoxy-2-thiophenevaleric acid.*—A cooled solution of 2.71 g. (0.01 mole) of 3-amino-4-carbethoxy-2-thiophenevaleric acid in 25 ml. of dry chloroform is treated with 1.4 ml. of benzoyl chloride. The mixture is protected by a calcium chloride tube and refluxed on the steam bath for 24 hours. Following removal of solvent by steam distillation, the residual brown oil is dissolved in ether, and the ether solution is extracted thrice with 5% sodium bicarbonate solution. The combined alkaline extracts are cooled, acidified to Congo red with dilute hydrochloric acid and extracted twice with ether. Combined ether extracts are dried with anhydrous sodium sulfate, the ether is evaporated and the residue is shaken with 200 ml. of petroleum ether (B. P. 35–60° C.) for the removal of benzoic acid. The resulting light tan solid is filtered. Recrystallization from dilute alcohol yields 2.77 g. (81%) of cream-colored needles, M. P. 126.5–127.5° C., having the formula

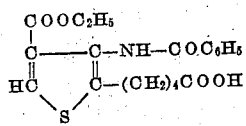

Anal.—Calcd. for $C_{18}H_{21}O_5NS$: C, 60.77; H, 5.63. Found: C, 60.70; H, 5.53.

*3-benzoylamino-2-Δ-carboxybutyl-4-thiophenecarboxylic acid hydrazide.*—A mixture of 1.10 g. (0.00293 mole) of 3-benzoylamino-4-carbethoxy-2-thiophenevaleric acid and 0.308 g. (0.00308 mole) of potassium bicarbonate is warmed with 25 ml. of 50% alcohol until solution is complete. Solvent is distilled at reduced pressure, leaving the potassium salt which is desiccated overnight in vacuo over phosphorus pentoxide. This dry salt is dissolved in 10 ml. of warm absolute alcohol, treated with 10 ml. of dry benzene and 2 ml. of 100% hydrazine hydrate, protected by a calcium chloride tube and refluxed on the steam bath for 16 hours under a Soxhlet extractor containing 25 g. of anhydrous calcium sulfate in its thimble. Solvent and excess hydrazine hydrate are distilled at reduced pressure, leaving a fluffy mixture consisting mainly of the potassium salt of 3-benzoylamino-2-Δ-carboxybutyl-4-thiophenecarboxylic acid hydrazide along with some potassium salt of unchanged 4-carbethoxy compound. The mixture is dissolved in 30 ml. of water. A yellow aqueous solution is obtained which can be mixed with inert water immiscible organic solvent, such as ether, and then acidified with a lower aliphatic carboxylic acid, such as acetic or propionic acid, whereby unchanged starting material goes into the ether solution but the desired 4-thiophenecarboxylic acid hydrazide is insoluble in the ether as well as the aqueous phase and can be filtered off. Thus, the yellow solution is covered with 30 ml. of ether and is made almost neutral to litmus with 5% hydrochloric acid solution. The ether of the resulting mixture serves to dissolve unchanged 4-carbethoxy starting material. The mixture is acidified with 10% acetic acid solution until no more precipitate forms. The mixture is stirred and cooled, and the white crystalline solid filtered off and dissolved in a minimum of boiling water, digested with activated charcoal, filtered and cooled. The fine, white crystals which separate weigh 0.95 g. (90% yield), and melt at 140–141° C. The formula of the compound is

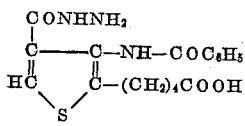

Anal.—Calcd. for $C_{17}H_{19}O_4N_3S$: C, 56.49; H, 5.30. Found: C, 56.40; H, 5.57.

In this example water is liberated when the hydrazine hydrate reacts. The water liberated is quickly carried into the refluxing vapors and by them into contact with the anhydrous calcium sulfate in the thimble and thereby removed from the reactants. The mixture of dry benzene with alcohol facilitates the removal of the water. Such procedure for removing water is important, since its use almost doubles the yield of hydrazide over that obtained when using alcohol in the absence of the benzene and the anhydrous calcium sulfate.

3 - benzoylamino - 2 - Δ-carboxybutyl-4-thiophenecarboxylic acid azide. — After dissolving 0.625 g. (0.00173 mole) of 3-benzoylamino-2-Δ-carboxybutyl-4-thiophenecarboxylic acid hydrazide in 5 ml. of glacial acetic acid by the application of heat, the well-stirred solution is cooled in an ice bath and treated with 0.2 ml. of concentrated hydrochloric acid. To the solid white precipitate thus formed is then added dropwise during five minutes a solution of 0.130 g. (0.00188 mole) of sodium nitrite in 3.5 ml. of water, and 1.5 ml. of water is used as a rinse. The hydrazide completely dissolves and the azide soon begins to precipitate. After one hour 25 ml. of water is added dropwise to effect complete precipitation and the mixture is stirred at 0° C. for an additional hour. The white azide is collected by suction, washed thoroughly with ice water and desiccated in vacuo over phosphorus pentoxide. It weighs 0.56 g. (87% yield) and decomposes at 99–100° C. Its formula is

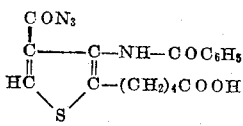

Anal.—Calcd. for $C_{17}H_{16}O_4N_4S$: C, 54.83; H, 4.33. Found: C, 55.11; H, 4.53.

Example 2

*Ethyl 3 - benzoylamino-2-γ-phenoxypropyl-4-thiophenecarboxylate.*—To a warm solution of 14.1 g. (0.046 mole) of 3-amino-4-carbethoxy-2-γ-phenoxypropyl-thiophene, M. P. 56–57° C. in 100 ml. of glacial acetic acid is added 100 ml. of a saturated solution of sodium acetate. The well-stirred suspension is cooled in an ice bath and 8 ml. (9.7 g.) (0.069 mole) of benzoyl chloride is added dropwise. Lumps of solid soon separate. After stirring for 40 minutes the suspension is filtered and washed with ice water. The granular product is dissolved in 180 ml. of hot glacial acetic acid, treated with 70 ml. of a saturated solution of sodium acetate, cooled in ice and again treated with 8 ml. of benzoyl chloride. As soon as the suspension solidifies the ice bath is removed, 50 ml. of water is added and the mixture is stirred at room temperature for 3.5 hours. Then 100 ml. of water is added and the suspension is cooled, filtered, washed with cold water and desiccated in vacuum over $P_2O_5$. Crystallization from alcohol following Darco treatment produces 15.7 g. (83% yield) of fine ivory crystals, M. P. 97–98° C. A sample of the compound is recrystallized from alcohol (Darco) as colorless needles, M. P. 98–99° C.

Anal.—Calcd. for $C_{23}H_{23}O_4NS$: C, 67.5; H, 5.66. Found: C, 67.38; H, 5.91.

Its formula is

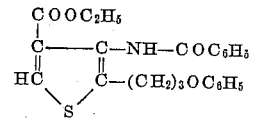

*3-benzoylamino-2-γ-phenoxypropyl - 4 - thiophenecarboxylic acid hydrazide.*—A mixture of 14.6 g. (0.0357 mole) of ethyl 3-benzoylamino-2-γ-phenoxypropyl-4-thiophenecarboxylate, 100 ml. of absolute alcohol and 25 ml. of 85% hydrazine hydrate is refluxed for 16 hours on the steam bath. During the night white crystals separate from solution. After removal of excess hydrazine by distillation at reduced pressure, the crystalline mass is boiled with about 700 ml. of absolute alcohol, cooled in an ice-salt bath and filtered. Following desiccation the fine lustrous crystals melt at 186.5–187.5° C. The yield is 13.1 g. or 93% of the theoretical.

Anal.—Calcd. for $C_{21}H_{21}O_3N_3S$: C, 63.8; H, 5.34. Found: C, 63.77; H, 5.29.

Its formula is

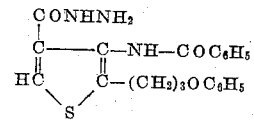

*3 - benzoylamino - 2 - γ-phenoxypropyl-4-thiophenecarboxylic acid azide.*—After dissolving 7.91 g. (0.020 mole) of the corresponding hydrazide, M. P. 186.5–187.5° C., in 200 ml. of glacial acetic acid by the application of heat, the well-stirred solution is cooled in an ice bath and treated with 2.25 ml. of concentrated HCl. A fine, white precipitate of the hydrochloride forms immediately. Then a solution of 1.50 g. (0.0217 mole) of sodium nitrite in 35 ml. of water is added dropwise during 7 minutes and the reaction mixture is stirred in the ice bath for 2.3 hours. Following filtration the white, finely crystalline azide is washed with 150 ml. of ice water and desiccated overnight in vacuum over $P_2O_5$; decomposition point, 108–109° C.; weight, 7.1 g.

Anal.—Calcd. for $C_{21}H_{18}O_3N_4S$: C, 61.9; H, 4.46; N, 13.79. Found: C, 62.30; H, 4.24; N, 13.78.

Its formula is

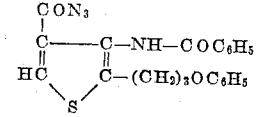

Example 3

*Ethyl 3-benzoylamino-2-γ-benzyloxypropyl-4-thiophenecarboxylate.* — A mixture of 2.79 g. (0.00875 mole) of 4-carbethoxy-3-amino-2-γ-benzyloxypropylthiophene, 13 ml. of dry chloroform and 1.2 ml. of benzoyl chloride is refluxed on the steam bath for 17 hours. The chloroform is removed by steam distillation. The water is poured from the oil after cooling. The oil is dissolved in alcohol and is given a treatment with Darco. The alcohol solution is concentrated after filtering from Darco and is treated with hot water until a faint turbidity remains. When cool, an oil separates out. Addition of a large volume of water precipitates more oil. After scratching and cooling for several hours the product begins to crystallize, yielding a tan material which is collected, dried and weighed. The weight of crude material is 3.4 g., yield 92%, M. P. 60° C. A sample is recrystallized three times from 80% ethanol to a melting point of 65–66° C.

Anal.—Calcd. for $C_{24}H_{25}O_4NS$: N, 3.31%. Found: N, 3.44%.

Its formula is

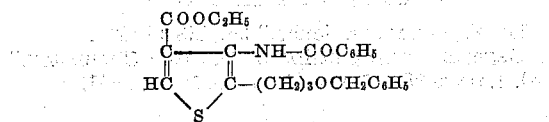

*3-benzoylamino-2-γ-benzyloxypropyl-4-thiophenecarboxylic acid hydrazide.*—A mixture of 2.96 g. (0.007 mole) of 4-carbethoxy-3-benzoylamino-2-γ-benzyloxypropylthiophene, 20 ml. of absolute alcohol and 5 ml. of 85% hydrazine hydrate is refluxed on the steam bath for 16 hours. The solution is cooled in an ice bath. After several hours a flocculent mass of crystals has formed. These are collected and dried. Weight, 0.64 g., M. P. 116–117° C. The filtrate is warmed and diluted with a large volume of water. Cooling and stirring produces further crystals of crude hydrazide. Weight, 1.89 g.

Anal.—Calcd. for $C_{22}H_{23}O_3N_3S$: N. 10.26%. Found: N, 10.07%.

Its formula is

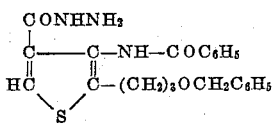

*3-benzoylamino-2-γ-benzyloxypropyl-4-thiophenecarboxylic acid azide.*—A solution of 2.43 g. (0.00594 mole) of 3-benzoylamino-2-γ-benzyloxypropyl-4-thiophenecarboxylic acid hydrazide is made in 25 ml. of glacial acetic acid. The solution is cooled in an ice bath until the acetic acid crystallizes. The ice bath is removed and the acetic acid is allowed to melt again before adding 0.67 ml. of concentrated HCl. The flask is returned to the ice bath and while the solution is being stirred vigorously it is treated with a solution of 0.446 g. (0.00646 mole) of $NaNO_2$ in 10.5 ml. of water. The addition is dropwise over a period of three minutes. The solution becomes turbid but no crystals form. After stirring for an hour, water is added dropwise until a white turbidity remains. This disappears and a dark oil forms. More water is added in this manner until finally white crystals begin to form. The mixture is stirred another hour before filtering off the crystals. These are washed thoroughly with ice water and then are dried over $P_2O_5$ in vacuum desiccator for 20 hours. Weight of crude azide is 2.15 g., yield 86%, M. P. 62–64° C.

Its formula is

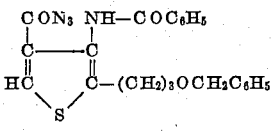

The 3-amino-4-carbethoxy-2-thiophenevaleric acid used in Example 1 as a starting material can be made from ethyl 3-amino-4-carbethoxy-2-thiophenevalerate of M. P. 43–44° C. as described in our Patent No. 2,443,598, aforesaid. This 44° C. melting compound is prepared from the oxime of ethyl 4-carbethoxy-3-keto-2-tetrahydrothiophenevalerate by treatment of a dry ether solution of the latter with dry hydrogen chloride gas, converting the amine hydrochloride to the amine with alkali bicarbonate, and finally partially hydrolyzing the amine to the monoester. The oxime mentioned is made from ethyl 4-carbethoxy-3-keto-2-tetrahydrothiophenevalerate and hydroxylamine hydrochloride by the known procedure for producing oximes from their corresponding ketones. The 3-keto compound is, in its turn, made from the action of dry sodium ethylate in dry benzene on β-carbethoxyethyl-α,ω-dicarbethoxyamyl sulfide of formula

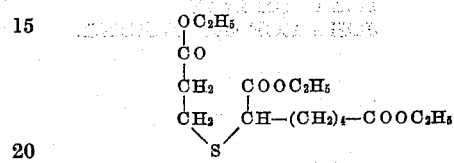

The cyclic 3-keto compound can be purified by way of its copper chelate salt.

The above mentioned sulfide is obtainable by reacting an alkaline solution of β-mercaptopropionic acid with α-chloropimelic acid. The α-chloropimelic acid is obtained by first reacting a solution of sodio ethyl malonate with ethyl Δ-chlorovalerate and hydrolyzing the tri-ester obtained into Δ-carboxybutylmalonic acid, thereafter using sulfuryl chloride to convert the butylmalonic acid compound to Δ-carboxybutylchloromalonic acid which can be decarboxylated by heat to α-chloropimelic acid of formula

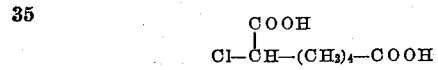

All of the above reactions for making the intermediate of Example 1 and also analogous intermediates for the other examples are described in United States applications of Lee C. Cheney and John Robert Piening, Serial No. 550,483 and Serial No. 550,484, filed August 21, 1944, both now abandoned, and Serial No. 551,619, filed August 28, 1944.

Numerous variations from the above examples, which are nevertheless within the scope of the invention, will occur to those skilled in the art. For example, in the first step wherein the 3-amino group is converted to an amide group, any suitable organic carboxylic acid acylating agent may be used, such as acetyl chloride, acetic anhydride, phenyl acetyl chloride, naphthoyl chloride as well as benzoyl chloride.

What we claim as our invention is:

1. A compound of the formula

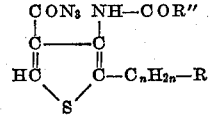

where the alkyl chain, —$C_nH_{2n}$—, consists of from 1 to 8 carbon atoms, where R is a radical of the class consisting of —COOH, —COOM, alkoxy, aralkoxy and aryloxy, R″CO— is an organic carboxylic acid acyl radical and M is a salt-forming basic group.

2. A compound of the formula

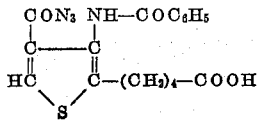

3. A compound of the formula
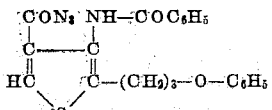
4. A compound of the formula
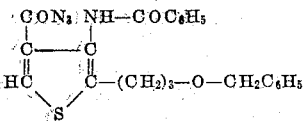
LEE C. CHENEY.
JOHN ROBERT PIENING.
REFERENCES CITED
The following references are of record in the file of this patent:
UNITED STATES PATENTS
| Number | Name | Date |
|---|---|---|
| 2,417,326 | Schnider | Mar. 11, 1947 |
OTHER REFERENCES
Du Vigneaud, "Science," 96, 458 (1942).
Degering, "An Outline of Organic Chemistry," Ed. 4, page 350, Barnes & Noble, N. Y., 1941.